United States Patent
Ruybal (10) Patent No.: US 11,165,274 B1
(45) Date of Patent: Nov. 2, 2021

(54) PORTABLE, MOTOR-DRIVEN ALTERNATOR FOR USE IN RECHARGING A BATTERY

(71) Applicant: Jay Dee Ruybal, Santa Fe, NM (US)

(72) Inventor: Jay Dee Ruybal, Santa Fe, NM (US)

( * ) Notice: Subject to any disclaimer, the term of this patent is extended or adjusted under 35 U.S.C. 154(b) by 420 days.

(21) Appl. No.: 16/378,805

(22) Filed: Apr. 9, 2019

(51) Int. Cl.
  *H02J 7/00* (2006.01)
  *H02J 7/14* (2006.01)
  *G05F 1/46* (2006.01)
  *H02J 7/04* (2006.01)

(52) U.S. Cl.
  CPC .............. *H02J 7/1415* (2013.01); *G05F 1/46* (2013.01); *H02J 7/04* (2013.01)

(58) Field of Classification Search
  CPC .................................................. H02J 7/1415
  USPC ........................................................ 320/107
  See application file for complete search history.

(56) References Cited

U.S. PATENT DOCUMENTS

| | | | |
|---|---|---|---|
| 4,397,369 A | 8/1983 | Read | |
| D364,602 S | 11/1995 | Qualis | |
| 5,793,185 A * | 8/1998 | Prelec | H02J 7/0042 320/104 |
| D413,098 S | 8/1999 | Dayan | |
| 6,371,072 B1 | 4/2002 | Huber | |
| 6,987,327 B1 | 1/2006 | Lucatero | |
| 7,253,534 B2 | 8/2007 | Vasilovich | |
| 7,692,402 B2 | 4/2010 | Wise | |
| 2005/0077878 A1* | 4/2005 | Carrier | H01M 10/441 320/134 |
| 2008/0238370 A1* | 10/2008 | Carrier | H02J 7/00036 320/134 |
| 2010/0207581 A1* | 8/2010 | Sakaue | H02J 7/0048 320/134 |
| 2011/0109101 A1 | 5/2011 | Whitney | |
| 2016/0020443 A1* | 1/2016 | White | H01M 10/425 318/245 |
| 2016/0204475 A1* | 7/2016 | White | H02P 29/032 429/97 |
| 2018/0198294 A1* | 7/2018 | Sheeks | H01M 10/443 |

FOREIGN PATENT DOCUMENTS

WO   2002011264   2/2002

* cited by examiner

*Primary Examiner* — Yalkew Fantu (57) ABSTRACT

The portable, motor-driven alternator for use in recharging a battery is configured for use with a battery. The portable, motor-driven alternator for use in recharging a battery comprises the modified chainsaw, an AC/DC converter, a selectable voltage regulator, a jumper cable, and a diode. The modified chainsaw generates electrical energy. The AC/DC converter converts the electrical energy from an AC voltage to an unregulated DC voltage. The selectable voltage regulator regulates the unregulated DC voltage from the AC/DC converter into a regulated voltage. The selectable voltage regulator generates a voltage level selected from a plurality of voltage levels. The jumper cable transfers the electrical energy from the selectable voltage regulator to the battery. The diode prevents the backflow of electrical energy from the battery into the selectable voltage regulator.

17 Claims, 6 Drawing Sheets

PORTABLE, MOTOR-DRIVEN ALTERNATOR FOR USE IN RECHARGING A BATTERY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity generation and arrangements for distributing electric energy, more specifically, an arrangement for charging batteries from dynamo-electric generators driven by a prime mover other than the engine of an automobile. (H02J7/1415)

A chainsaw is an internally powered mechanical cutting tool. The chainsaw comprises a shell 111, an internal combustion engine 112, a fuel tank 113, a plurality of starting mechanisms 114, and a cutting blade. The shell 111 is a rigid-structure that encloses the internal combustion engine 112, the fuel tank 113, and the cutting blade. The cutting blade is a blade structure around which a chain rotates. The chain forms the cutting edge of the cutting blade. The internal combustion engine 112 mechanically rotates the chain around the cutting blade. The internal combustion engine 112 converts the chemical potential energy drawn from a fuel drawn from the fuel tank 113 into the mechanical energy necessary to rotate the chain. Each of the plurality of starting mechanism 114 is a device used to initiate the operation of the internal combustion engine 112.

A first advantage of a chainsaw is that it is small and easily stored. A second advantage of a chainsaw is that the weight of a chainsaw is light enough to be easily transported. A third advantage of a chainsaw is that, relative to its light-weight, a chainsaw is capable of generating a significant amount of power. Clearly, the ability to use a chainsaw to power other devices would be a big advantage for many applications.

SUMMARY OF INVENTION

The portable, motor-driven alternator for use in recharging a battery discloses a modified chainsaw. The portable, motor-driven alternator for use in recharging a battery is configured for use with a battery. The battery is further defined with a positive terminal and a negative terminal. The modifications described in the portable, motor-driven alternator for use in recharging a battery convert the modified chainsaw into an electricity-generating device used for recharging the battery. The portable, motor-driven alternator for use in recharging a battery comprises the modified chainsaw, an AC/DC converter, a selectable voltage regulator, a jumper cable, and a diode. The modified chainsaw generates electrical energy. The AC/DC converter converts the electrical energy from an AC voltage to an unregulated DC voltage. The selectable voltage regulator regulates the unregulated DC voltage from the AC/DC converter into a regulated voltage. The selectable voltage regulator generates a voltage level selected from a plurality of voltage levels. The jumper cable transfers the electrical energy from the selectable voltage regulator to the battery. The diode prevents the backflow of electrical energy from the battery into the selectable voltage regulator.

These together with additional objects, features and advantages of the portable, motor-driven alternator for use in recharging a battery will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable, motor-driven alternator for use in recharging a battery in detail, it is to be understood that the portable, motor-driven alternator for use in recharging a battery is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable, motor-driven alternator for use in recharging a battery.

It is therefore important that the claims be regarded as including such equivalent construction insofar as they do not depart from the spirit and scope of the portable, motor-driven alternator for use in recharging a battery. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary of the following detailed description.

Figure 1:
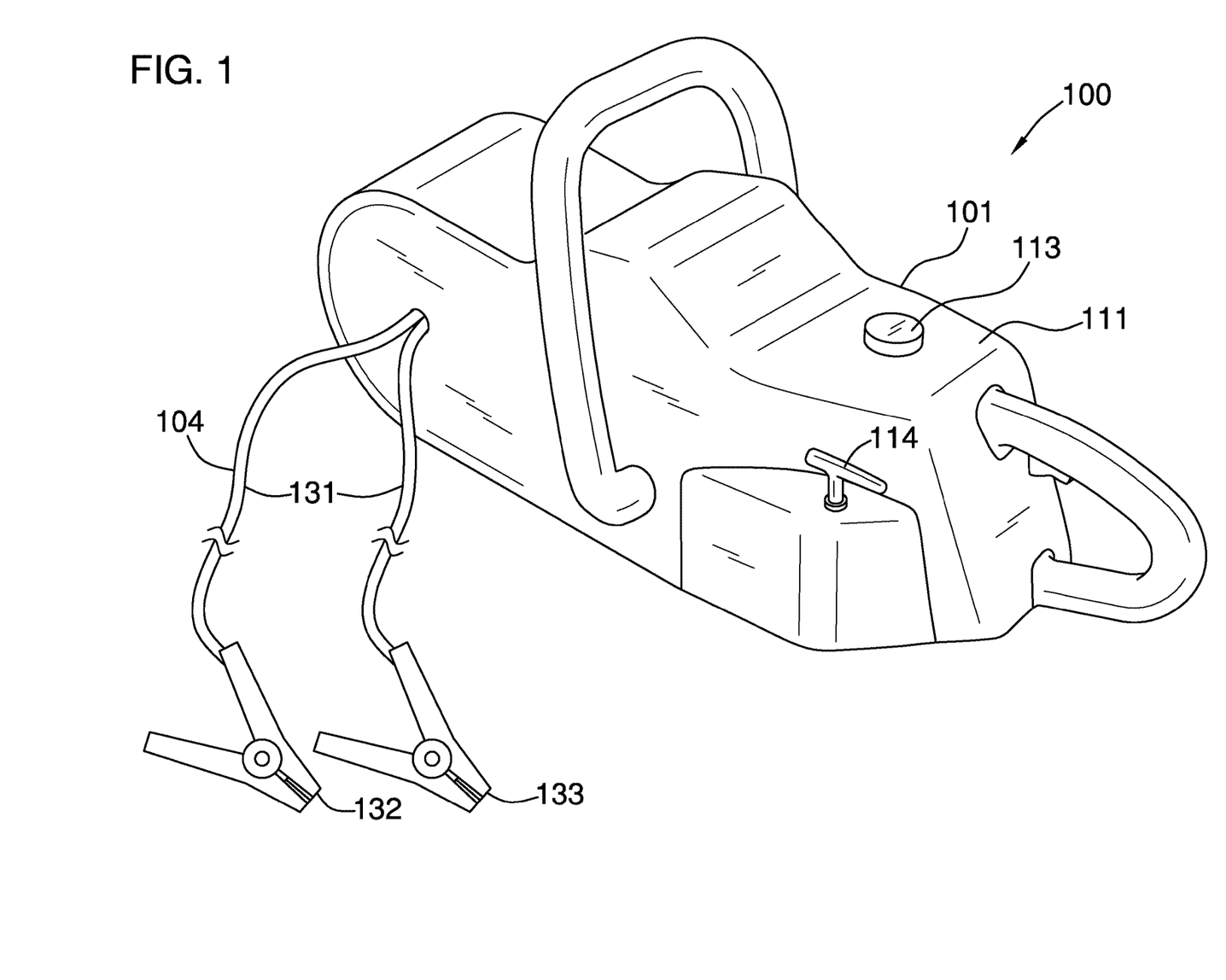
FIG. 1 is a perspective view of an embodiment of the disclosure.
Figure 2:
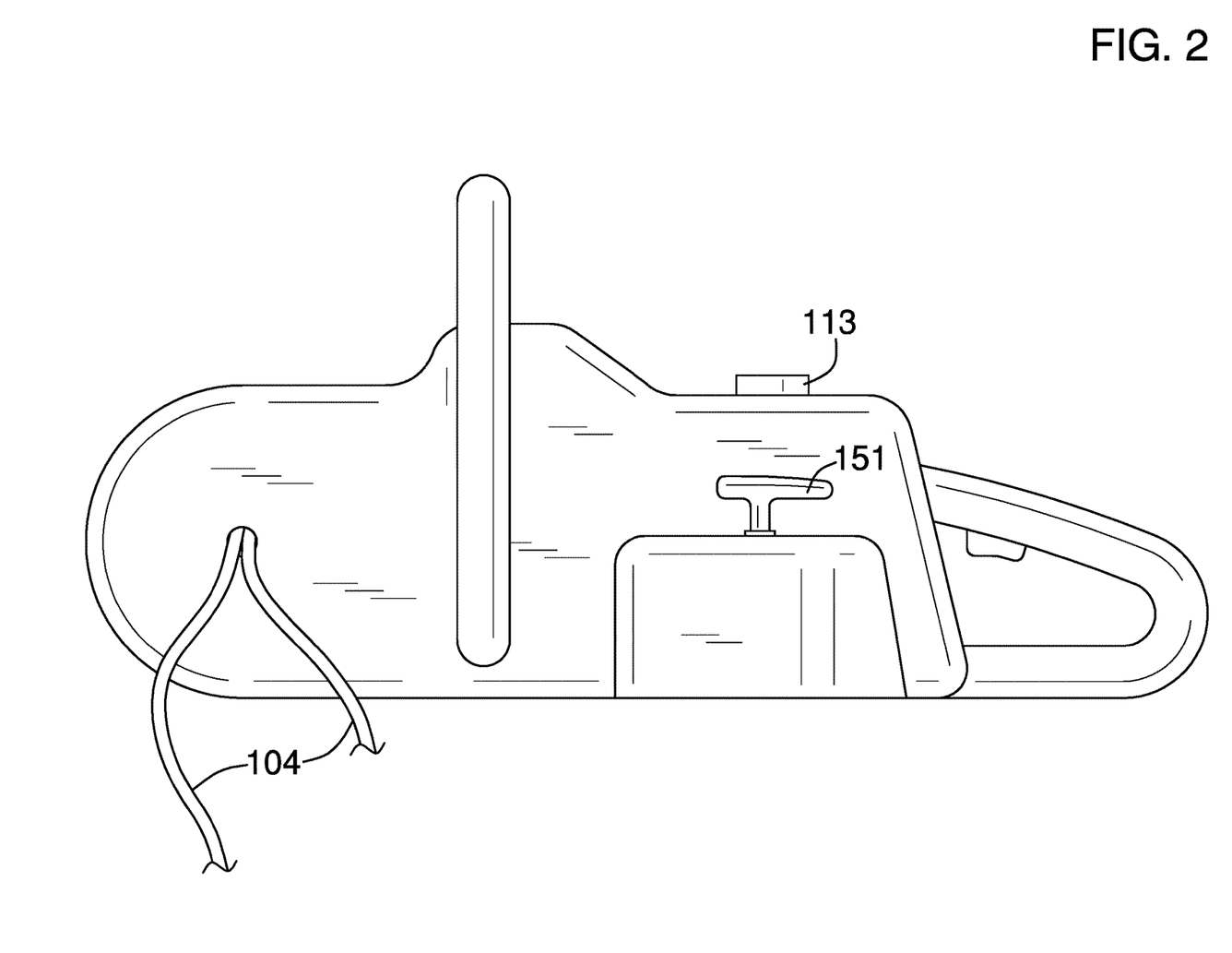
FIG. 2 is a side view of an embodiment of the disclosure.
Figure 3:
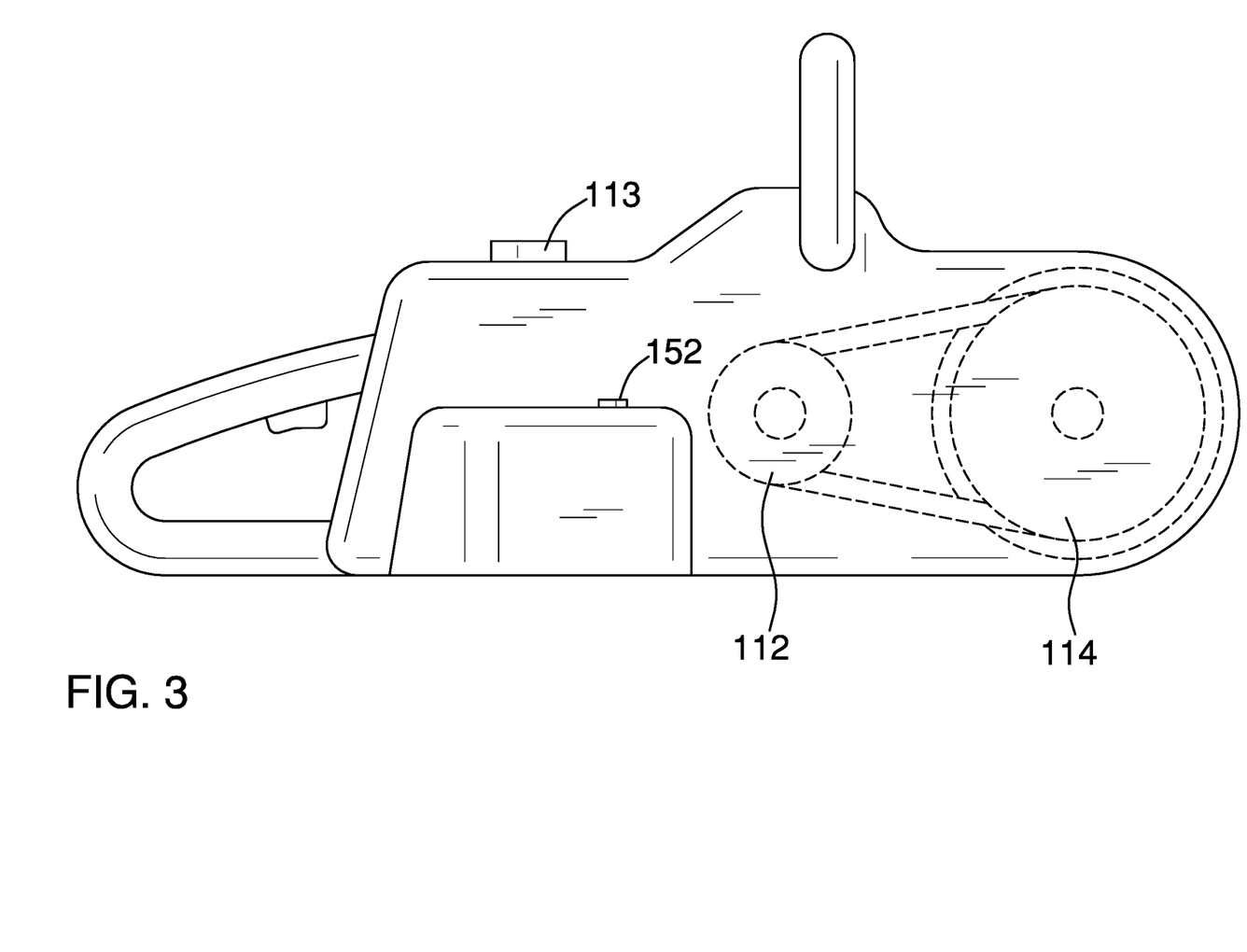
FIG. 3 is an opposite side view of an embodiment of the disclosure.
Figure 4:
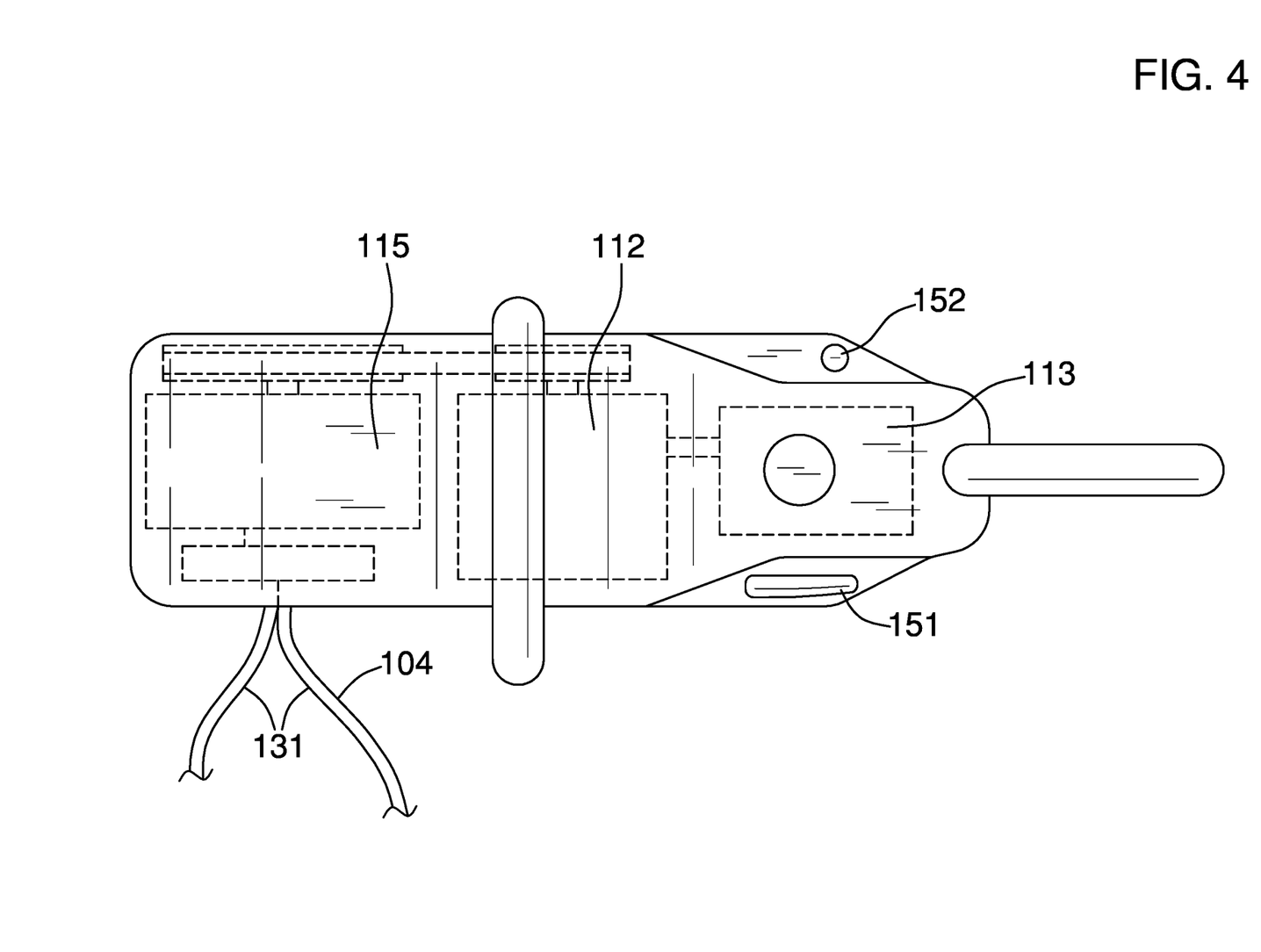
FIG. 4 is a top view of an embodiment of the disclosure.
Figure 5:
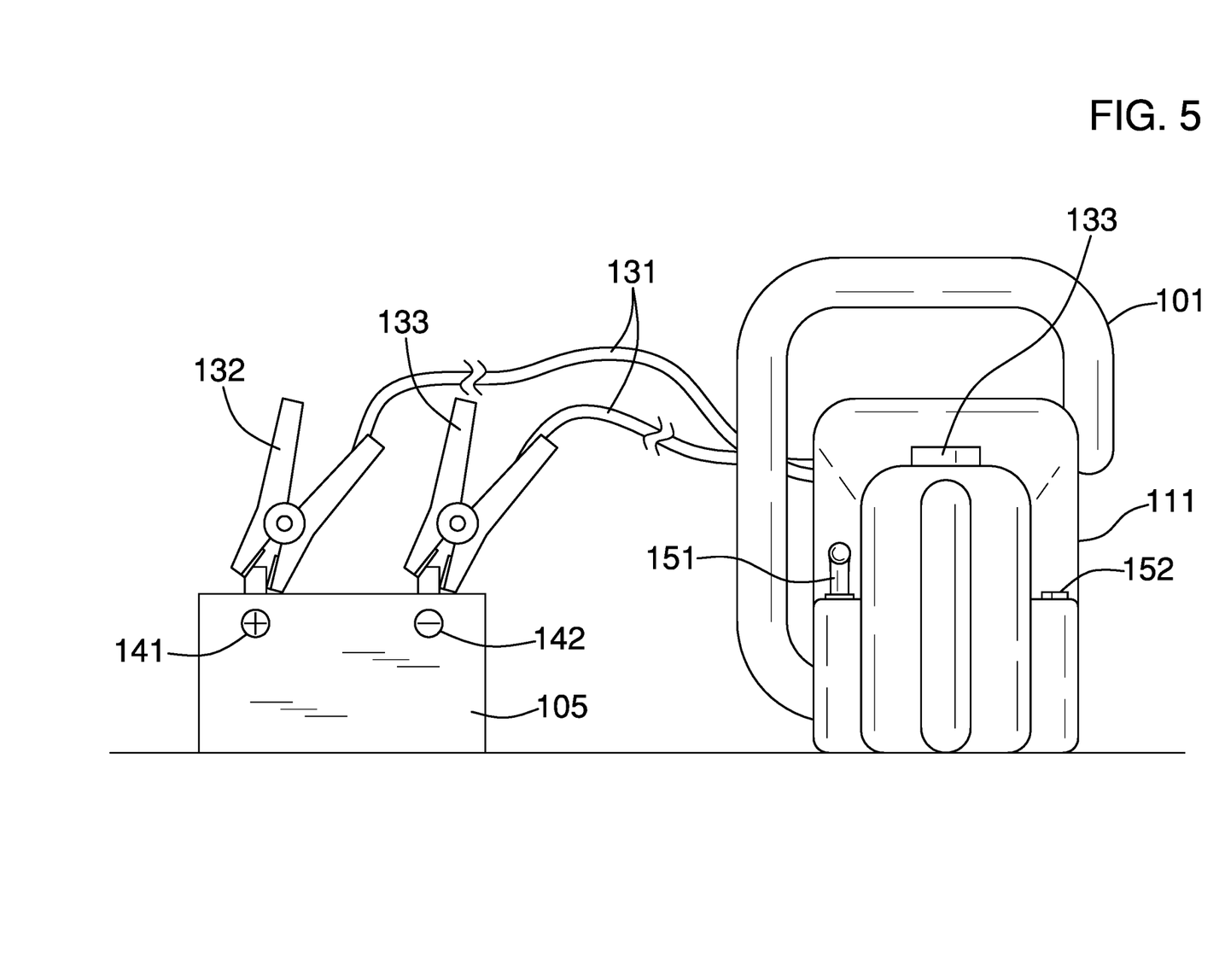
FIG. 5 is a front view of an embodiment of the disclosure.
Figure 6:
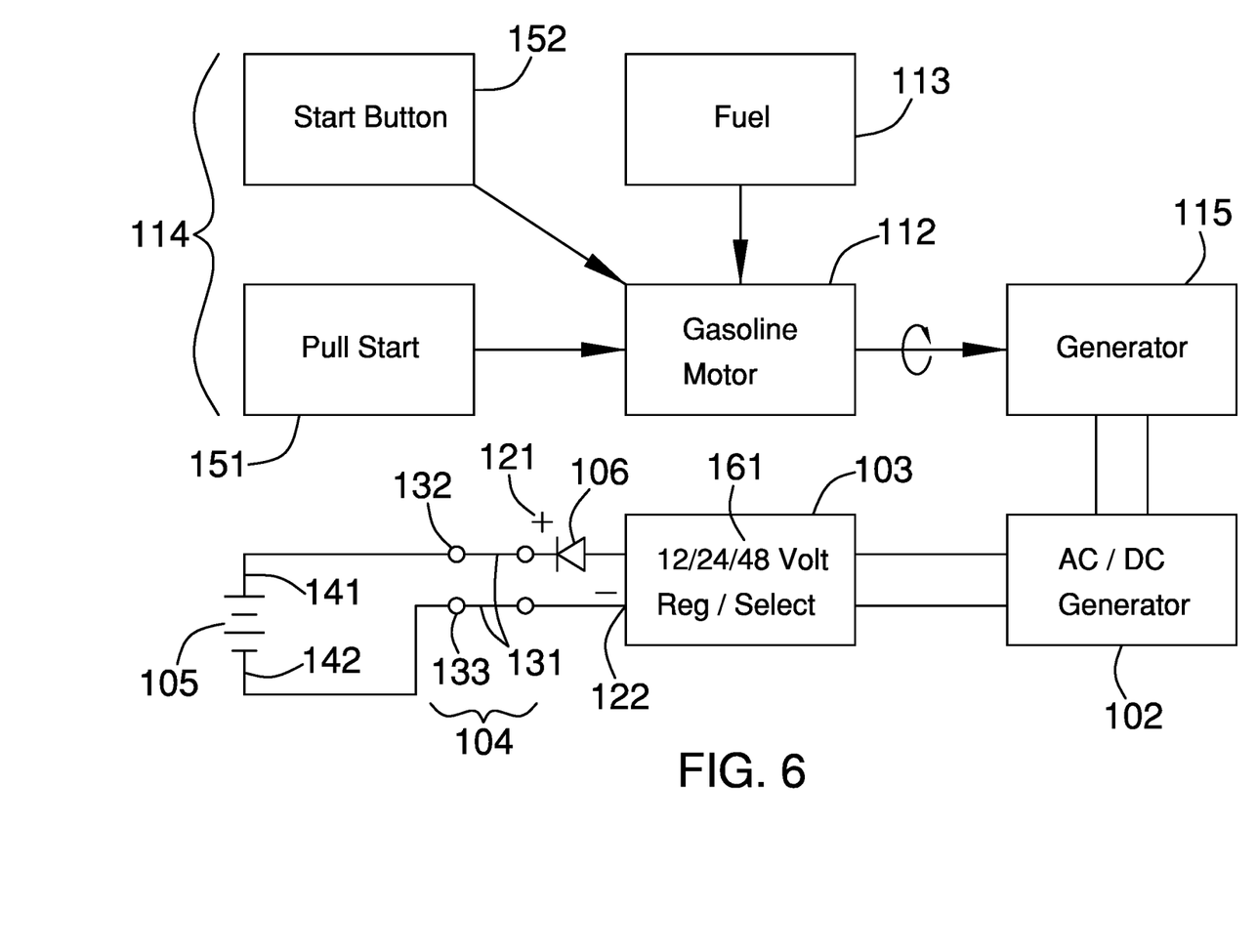
FIG. 6 is a block diagram of an embodiment of the disclosure.

Detailed reference will now be made to one or more potential embodiments of the disclosure, which are illustrated in FIGS. 1 through 6.

The portable, motor-driven alternator for use in recharging a battery 100 (hereinafter invention) discloses a modified chainsaw 101. The invention 100 is configured for use with a battery 105. The battery 105 is further defined with a positive terminal 141 and a negative terminal 142. The positive terminal 141 is a first of two terminals that provides an electrical connection to the battery 105. The negative terminal 142 is a second of two terminals that provides an electrical connection to the battery 105.

The modifications described in the invention 100 converts the modified chainsaw 101 into an electricity generating device used for recharging the battery 105. The invention 100 comprises the modified chainsaw 101, an AC/DC converter 102, a selectable voltage regulator 103, a jumper cable 104, and a diode 106. The modified chainsaw 101 generates electrical energy. The AC/DC converter 102 converts the electrical energy from an AC voltage to an unregulated DC voltage. The selectable voltage regulator 103 regulates the unregulated DC voltage from the AC/DC converter 102 into a regulated voltage. The selectable voltage regulator 103 generates a voltage level selected from a plurality of reference DC voltage levels 161. The jumper cable 104 transfers the electrical energy from the selectable voltage regulator 103 to the battery 105. The diode 106 prevents the backflow of electrical energy from the jumper cable 104 into the selectable voltage regulator 103.

The modified chainsaw 101 is a chainsaw that has been modified to generate electricity. Specifically, the modified chainsaw 101 has had the blade replaced with a generator 115. The generator 115 attaches to the internal combustion engine 112 such that the operation of the internal combustion engine 112 rotates the generator 115 such that the generator 115 generates electricity. The modified chainsaw 101 contains the AC/DC converter 102, the selectable voltage regulator 103, the jumper cable 104, and the diode 106. The modified chainsaw 101 operates in the manner of a normal chainsaw.

The modified chainsaw 101 comprises a shell 111, an internal combustion engine 112, a fuel tank 113, a plurality of starting mechanisms 114, and the generator 115.

The shell 111 is a rigid casing. The shell 111 contains the internal combustion engine 112, the fuel tank 113, the plurality of starting mechanisms 114, the generator 115, the AC/DC converter 102, the selectable voltage regulator 103, the jumper cable 104, and the diode 106. The shell 111 is formed with all apertures and form factors necessary to allow the shell 111 to accommodate the use and operation of the invention 100. Methods to form a shell 111 suitable for the purposes described in this disclosure are well-known and documented in the mechanical arts.

The internal combustion engine 112 is a commercially available motor. The internal combustion engine 112 is an unmodified element of the modified chainsaw 101.

The fuel tank 113 is a fluid containment structure that contains a liquid fuel used to power the internal combustion engine 112. The fuel tank 113 is an unmodified element of the modified chainsaw 101.

Each of the plurality of starting mechanisms 114 is a device used to initiate the operation of the internal combustion engine 112. Any first starting mechanism selected from the plurality of starting mechanisms 114 operates independently of any second starting mechanism selected from the plurality of starting mechanisms 114. The plurality of starting mechanisms 114 is an unmodified element of the modified chainsaw 101. The plurality of starting mechanisms 114 comprises a pull cord 151 and an electric start 152.

The pull cord 151 is a mechanical device used to initiate the operation of the internal combustion engine 112. The use of a pull cord 151 is well-known and documented in the operation of a chainsaw. The electric start 152 is an electrical device used to initiate the operation of the internal combustion engine 112. The use of an electric start 152 is well-known and documented in the operation of a chainsaw.

The generator 115 is an electromechanical device. The generator 115 is a magnetic device. The generator 115 is a rotating device. The generator 115 is linked to the internal combustion engine 112 such that the operation of the internal combustion engine 112 rotates the generator 115. The rotation of the generator 115 generates an unregulated AC voltage that electrically connects to the AC/DC converter 102.

The AC/DC converter 102 is an electric circuit. The AC/DC converter 102 receives the AC electrical energy generated by the generator 115 as an input. The AC/DC converter 102 converts the received AC electrical energy into an unregulated DC electrical energy. The design and manufacture of an AC/DC converter 102 are well-known and documented in the electrical arts.

The selectable voltage regulator 103 is an electric circuit. The selectable voltage regulator 103 conditions the unregulated DC voltage received from the AC/DC converter 102. By conditioned is meant that the selectable voltage regulator 103 generates a DC voltage level that is independent of variations in the unregulated DC voltage that is provided by the AC/DC converter 102. By independent of variations in the unregulated DC voltage that is provided by the AC/DC converter 102 is meant that the DC voltage output generated by the selectable voltage regulator 103 will not vary from a designed reference DC voltage output by more than a selected design goal. The selected design goal is selected from the group consisting of: a) not significantly different; and, b) negligible difference.

The output DC voltage of the selectable voltage regulator 103 is selectable. By selectable is meant that the reference DC voltage of the selectable voltage regulator 103 is selected from a plurality of reference DC voltage levels 161. Each of the plurality of reference DC voltage levels 161 is a previously determined nominal DC voltage. The selectable voltage regulator 103 is configured such that the regulated DC voltage level generated by the selectable voltage regulator 103 is selectable from the plurality of reference DC voltage levels 161. The design and manufacture of a voltage regulator suitable for use as the selectable voltage regulator 103 is well-known and documented in the electrical arts.

The selectable voltage regulator 103 further comprises a positive output 121 and a negative output 122. The positive output 121 is a first of two terminals that provides an electrical connection to the regulated DC voltage created by the selectable voltage regulator 103. The negative output 122 is a second of two terminals that provides an electrical connection to the regulated DC voltage created by the selectable voltage regulator 103.

The jumper cable 104 is a commercially available electrical cable. The jumper cable 104 is well-known and documented in our society. The jumper cable 104 further comprises an electric cable 131.

The electric cable 131 is a commercially available electrical conductor. The electric cable 131 further comprises a positive lead 132 and a negative lead 133. The positive lead 132 is an alligator clip that: a) electrically connects to the positive output 121 of the selectable voltage regulator 103; and b) forms an electrical terminal that allows the positive output 121 to electrically connect to the positive terminal 141 of the battery 105. The negative lead 133 is an alligator clip that: a) electrically connects to the negative output 122 of the selectable voltage regulator 103; and b) forms an electrical terminal that allows the negative output 122 to electrically connect to the negative terminal 142 of the battery 105.

The battery 105 is an externally provisioned chemical device that converts chemical potential energy into electrical energy.

The battery 105 is a rechargeable battery 105. The chemical energy stored within the rechargeable battery 105 is renewed and restored through the use of the jumper cables 104. The jumper cables 104 is an electrical circuit that reverses the polarity of the rechargeable battery 105 and provides the energy necessary to reverse the chemical processes that the rechargeable battery 105 initially used to generate the electrical energy. This reversal of the chemical process creates a chemical potential energy that will later be used by the rechargeable battery 105 to generate electricity.

The jumper cable 104 attaches to the selectable voltage regulator 103. The battery 105 receives electrical energy from the selectable voltage regulator 103 through the jumper cable 104. The diode 106 is an electrical device that allows current to flow in only one direction. The diode 106 installs between the selectable voltage regulator 103 and the jumper cables 104 such that electricity will not flow from the positive terminal 141 of the rechargeable battery 105 into the positive output 121 of the selectable voltage regulator 103.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well-known in the electrical arts. The AC/DC converter is further defined with a positive terminal, a negative terminal, and a power input.

Battery: As used in this disclosure, a battery is a chemical device consisting of one or more cells, in which chemical energy is converted into electricity and used as a source of power. Batteries are commonly defined with a positive terminal and a negative terminal.

Cable: As used in this disclosure, a cable is a collection of insulated wires covered by a protective casing that is used for transmitting electricity or telecommunication signals.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon potentially modified by functional groups, which releases energy.

Combustion engine: As used in this disclosure, a combustion engine is an engine powered by burning fuel within the engine. Two common examples would be: 1) internal combustion engines; and, 2) engines designed with one or more cylinders where combustion takes place within the cylinder.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Engine: As used in this disclosure, an engine is a device with moving parts that is used to convert energy into rotational or linear motion. In this disclosure, an engine is a synonym for motor.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Fuel: As used in this disclosure, fuel refers to a substance that undergoes a chemical combustion reaction to release chemical potential energy.

Generator: In this disclosure, a generator is a machine that converts rotational mechanical energy into electric energy. A generator typically comprises a stator and a rotor. The stator is a stationary hollow cylindrical structure that forms a magnetic field. The rotor is a rotating cylindrical structure that coaxially mounts in the stator. The rotation of the rotor within the stator physically generates the electrical energy. A generator can generate an electrical voltage selected from the group consisting of an AC voltage and a DC voltage. When a DC voltage is generated, this disclosure assumes that the term generator includes commutator and electrical circuitry required to generate a regulated DC voltage.

Grip: As used in this disclosure, a grip is an accommodation formed on or within an object that allows the object to be grasped or manipulated by a hand.

Handheld: As used in this disclosure, when referring to an item or device, handheld means that the item or device is small and light enough: 1) to operate while a person holds the item or device in their hands; and, 2) to carry by hand over a distance.

Handle: As used in this disclosure, a handle is an object by which a tool, object, or door is held or manipulated with the hand.

Housing: As used in this disclosure, a housing is a rigid casing that encloses and protects one or more devices.

Lead: As used in this disclosure, a lead is a conductor that is physically used to electrically connect an electrical component into a larger circuit assembly.

Motor: As used in this disclosure, a motor refers to the method of transferring energy from an external power source into rotational mechanical energy.

Negligible Difference: As used in this disclosure, the term negligible difference is a term that compares a specified property of a first object to the corresponding property of a reference object (reference property). The specified property is considered to have a negligible difference from the reference property when the absolute value of the difference between the specified property and the reference property is less than 1.0% of the reference property value.

Nominal: As used in this disclosure, the term nominal refers to a designed or intended value of the measure of a physical parameter of an object. The use of the term nominal implies that the exact value of the physical parameter of an instantiation of the object can have insignificant variation from the nominal value. By insignificant is meant that these variations will not interfere with the intended use of the object. The sources of variations can include, but are not limited to, manufacturing tolerances and traditional rounding practices such as those employed in the sale of lumber or plumbing supplies.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Orientation: As used in this disclosure, orientation refers to the positioning of a first object relative to: 1) a second object; or, 2) a fixed position, location, or direction.

Regulated Voltage: As used in this disclosure, a regulated voltage refers to a source of DC voltage that incorporates circuitry that reduces changes in output voltages that occur in response to changes to the circuit's input power supply voltage or to changes in output, or load, current.

Rigid Structure: As used in this disclosure, a rigid structure is a solid structure formed from an inelastic material that resists changes in shape. A rigid structure will permanently deform as it fails under a force.

Shell: As used in this disclosure, a shell is a structure that forms an outer covering intended to contain an object. Shells are often, but not necessarily, rigid or semi-rigid structures that are intended to protect the object contained within it.

Tank: As used in this disclosure, a tank is an enclosed hollow structure used to store a fluid.

Terminal: As used in this disclosure, a terminal is the end point of a conductor. A terminal can be the conducting wire itself or may have attached to is a device designed to facilitate an electrical connection.

Unregulated Voltage: This refers to a source of DC voltage that changes in response to changes to the circuit's input power supply voltage or to changes in output, or load, current.

Voltage Regulator: As used in this disclosure, a voltage regulator refers to an electrical circuit that takes unregulated voltage as its power input and provides a constant output voltage independent of variations to input power supply voltage or output, or load, current.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A device for charging a battery comprising:
a modified chainsaw, an AC/DC converter, a selectable voltage regulator, a jumper cable, and a diode;
wherein the modified chainsaw generates electrical energy;
wherein the AC/DC converter converts the electrical energy from an AC voltage to an unregulated DC voltage;
wherein the selectable voltage regulator regulates the unregulated DC voltage from the AC/DC converter into a regulated voltage;
wherein the device for charging a battery is configured for use with a battery;
wherein the battery is further defined with a positive terminal and a negative terminal;
wherein the device for charging a battery recharges the battery;
wherein the jumper cable transfers the electrical energy from the selectable voltage regulator to the battery;
wherein the diode prevents the backflow of electrical energy from the jumper cable into the selectable voltage regulator;
wherein the selectable voltage regulator generates a voltage level selected from a plurality of reference DC voltage levels;
wherein the modified chainsaw is a chainsaw that has been modified to generate electricity;
wherein a blade of the modified chainsaw is replaced with a generator;
wherein the modified chainsaw contains the AC/DC converter, the selectable voltage regulator, the jumper cable, and the diode;
wherein the modified chainsaw comprises a shell, an internal combustion engine, a fuel tank, a plurality of starting mechanisms, and the generator;
wherein the modified chainsaw contains the internal combustion engine, the fuel tank, the plurality of starting mechanisms, the generator, the AC/DC converter, the selectable voltage regulator, the jumper cable, and the diode;
wherein the generator attaches to the internal combustion engine such that the operation of the internal combustion engine rotates the generator such that the generator generates electricity.

2. The device for charging a battery according to claim 1 wherein the shell is a rigid casing;
wherein the shell contains the internal combustion engine, the fuel tank, the plurality of starting mechanisms, the generator, the AC/DC converter, the selectable voltage regulator, the jumper cable, and the diode.

3. The device for charging a battery according to claim 2 wherein the internal combustion engine is an engine;
wherein the internal combustion engine is an unmodified element of the modified chainsaw.

4. The device for charging a battery according to claim 3 wherein the fuel tank is a fluid containment structure;
wherein the fuel tank contains a liquid fuel;
wherein the fuel tank is an unmodified element of the modified chainsaw.

5. The device for charging a battery according to claim 4 wherein each of the plurality of starting mechanisms is a device;
wherein each of the plurality of starting mechanisms initiate the operation of the internal combustion engine;
wherein the plurality of starting mechanisms are an unmodified elements of the modified chainsaw.

6. The device for charging a battery according to claim 5 wherein any first starting mechanism selected from the plurality of starting mechanisms operates independently of any second starting mechanism selected from the plurality of starting mechanisms.

7. The device for charging a battery according to claim 6
    wherein the plurality of starting mechanisms comprises a pull cord and an electric start;
    wherein the pull cord is a mechanical device used to initiate the operation of the internal combustion engine;
    wherein the electric start is an electrical device used to initiate the operation of the internal combustion engine.

8. The device for charging a battery according to claim 7
    wherein the generator is an electromechanical device;
    wherein the generator is a magnetic device;
    wherein the generator is a rotating device;
    wherein the rotation of the generator generates an unregulated AC voltage that electrically connects to the AC/DC converter.

9. The device for charging a battery according to claim 8
    wherein the AC/DC converter is an electric circuit;
    wherein the AC/DC converter receives the AC electrical energy generated by the generator as an input;
    wherein the AC/DC converter converts the received AC electrical energy into an unregulated DC electrical energy.

10. The device for charging a battery according to claim 9
    wherein the selectable voltage regulator is an electric circuit;
    wherein the selectable voltage regulator conditions the unregulated DC voltage received from the AC/DC converter;
    wherein by conditioned is meant that the selectable voltage regulator generates a DC voltage level that is independent of variations in the unregulated DC voltage that is provided by the AC/DC converter;
    wherein by independent of variations in the unregulated DC voltage that is provided by the AC/DC converter is meant that the DC voltage output generated by the selectable voltage regulator will not vary from a designed reference DC voltage output by more than a selected design goal;
    wherein the selected design goal is selected from the group consisting of: a) not significantly different; and, b) negligible difference.

11. The device for charging a battery according to claim 10
    wherein the output DC voltage of the selectable voltage regulator is selectable;
    wherein by selectable is meant that the reference DC voltage of the selectable voltage regulator is selected from a plurality of reference DC voltage levels;
    wherein each of the plurality of reference DC voltage levels is a previously determined nominal DC voltage.

12. The device for charging a battery according to claim 11 wherein the selectable voltage regulator is configured such that the regulated DC voltage level generated by the selectable voltage regulator is selectable from the plurality of reference DC voltage levels.

13. The device for charging a battery according to claim 12
    wherein the selectable voltage regulator further comprises a positive output and a negative output;
    wherein the positive output is a first of two terminals that provides an electrical connection to the regulated DC voltage created by the selectable voltage regulator;
    wherein the negative output is a second of two terminals that provides an electrical connection to the regulated DC voltage created by the selectable voltage regulator.

14. The device for charging a battery according to claim 13
    wherein the jumper cable is an electrical cable;
    wherein the electric cable further comprises a positive lead and a negative lead;
    wherein the positive lead is an alligator clip;
    wherein the negative lead is an alligator clip.

15. The device for charging a battery according to claim 14
    wherein the positive lead: a) electrically connects to the positive output of the selectable voltage regulator; and b) forms an electrical terminal that allows the positive output to electrically connect to the positive terminal of the battery;
    wherein the negative lead: a) electrically connects to the negative output of the selectable voltage regulator; and b) forms an electrical terminal that allows the negative output to electrically connect to the negative terminal of the battery.

16. The device for charging a battery according to claim 15
    wherein the battery is a chemical device that converts chemical potential energy into electrical energy;
    wherein the jumper cables create an electrical circuit that reverses the polarity of the rechargeable battery;
    wherein the jumper cable attaches to the selectable voltage regulator;
    wherein the battery receives electrical energy from the selectable voltage regulator through the jumper cable.

17. The device for charging a battery according to claim 16
    wherein the diode is an electrical device that allows current to flow in only one direction;
    wherein the diode installs between the selectable voltage regulator and the jumper cables such that electricity will not flow from the positive terminal of the rechargeable battery into the positive output of the selectable voltage regulator.

* * * * *